US010589753B2

(12) United States Patent
Kwon et al.

(10) Patent No.: US 10,589,753 B2
(45) Date of Patent: Mar. 17, 2020

(54) VEHICLE WARNING SYSTEM FOR HEARING-IMPAIRED PERSON AND CONTROL METHOD THEREOF

(71) Applicants: Hyundai Motor Company, Seoul (KR); KIA Motors Corporation, Seoul (KR)

(72) Inventors: Jun Young Kwon, Seoul (KR); Seong Hyeon Lee, Suwon-si (KR); Oh Sol Kwon, Busan (KR); Joo Hwan Lee, Seoul (KR); Jong Won Kim, Cheonan-si (KR); Hyeong Jun Park, Gimpo-si (KR); Ji In Jung, Pohang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/166,912

(22) Filed: Oct. 22, 2018

(65) Prior Publication Data

US 2019/0359229 A1   Nov. 28, 2019

(30) Foreign Application Priority Data

May 23, 2018   (KR) ........................ 10-2018-0058164

(51) Int. Cl.
*B60Q 1/00*   (2006.01)
*B60W 50/16*   (2020.01)
*G08G 1/0962*   (2006.01)
*G08B 6/00*   (2006.01)
*G08G 1/16*   (2006.01)
(Continued)

(52) U.S. Cl.
CPC ............... *B60W 50/16* (2013.01); *G08B 6/00* (2013.01); *G08G 1/0962* (2013.01); *G08G 1/166* (2013.01); *B60Q 9/008* (2013.01); *B60W 2050/146* (2013.01)

(58) Field of Classification Search
None
See application file for complete search history.

(56) References Cited

U.S. PATENT DOCUMENTS 9,171,447 B2 * 10/2015 Davis ..................... G08G 1/005
2014/0301567 A1 * 10/2014 Kim ......................... H04R 3/04
381/94.1
2016/0355125 A1 * 12/2016 Herbert .................. B60K 35/00

FOREIGN PATENT DOCUMENTS

KR   10-2014-0071084 A   6/2014

* cited by examiner

*Primary Examiner* — Adolf Dsouza
(74) *Attorney, Agent, or Firm* — Brinks Gilson & Lione

(57) ABSTRACT

A warning system for a hearing-impaired person of a vehicle includes: a sound sensing unit disposed at a vehicle to sense sound outside of the vehicle; a database storing characteristic information of a plurality of specific sounds and visual information corresponding to the characteristic information of the plurality of specific sounds; an output unit outputting visual information corresponding to the plurality of specific sounds; and a controller extracting characteristic information of the sound sensed by the sound sensing units. In particular, the controller determines a type of the sensed sound by comparing the extracted characteristic information of the sensed sound with the characteristic information of the plurality of specific sounds stored in the database, and outputs visual information corresponding to the determined type of the sensed sound through the output unit.

12 Claims, 7 Drawing Sheets

(51) Int. Cl.
*B60W 50/14* (2020.01)
*B60Q 9/00* (2006.01)

VEHICLE WARNING SYSTEM FOR HEARING-IMPAIRED PERSON AND CONTROL METHOD THEREOF

CROSS REFERENCE TO RELATED APPLICATION

The present application claims priority to and the benefit of Korean Patent Application No. 10-2018-0058164, filed on May 23, 2018, the entire contents of which are incorporated herein by reference.

FIELD

The present disclosure relates to an automotive warning system and a method of controlling the warning system. More particularly, the present disclosure relates to an automotive warning system that enables a hearing-impaired driver to more easily determine an outside situation and cope with the outside situation.

BACKGROUND

The statements in this section merely provide background information related to the present disclosure and may not constitute prior art.

Hearing-impaired people who cannot hear voices and sounds due to congenital or postnatal loss of the sense of hearing are exposed to various inconveniences and dangers because they cannot hear sounds in daily life. In particular, as vehicles are popularized and more hearing-impaired people drive vehicles. However, hearing-impaired people have to recognize all surrounding situations simply only through the sense of sight while driving, so they are more easily exposed to traffic accidents and safety accidents more than non-hearing-impaired people.

In general, a horn sound and a warning sound are used to let other people to know an emergency situation or a warning situation in driving. Accordingly, drivers can recognize the surrounding situations through a horn sound and a warning sound from other vehicles and can avoid traffic accidents. As sound signals that are generated when vehicles are driven, there are sirens of an ambulance, a fire engine, a police car, and a tow truck, sound by a collision and sudden braking, and the warning sound of a railway cross gate, and drivers can immediately recognize surrounding situations and start defensive driving upon hearing these sound signals.

However, hearing-impaired people cannot hear sound signals that are frequently generated such as a horn sound and have to only visually recognize all surrounding situations when they drive, so they easily feel tired due to excessive nervousness. Further, they recognize a warning late and cannot quickly take appropriate measures, which causes traffic accidents in many cases.

SUMMARY

The present disclosure provides a warning system for a hearing-impaired person of a vehicle and a method of controlling the warning system. The system and method enable hearing-impaired people who have difficulty in hearing horn sounds and warning sounds to safely drive with appropriate measures when horn sounds and warning sounds are generated by nearby vehicles by providing visual information corresponding to the horn sounds and warning sounds through an output unit.

In one form of the present disclosure, a warning system for a hearing-impaired person of a vehicle may include: a sound sensing unit disposed at a vehicle and configured to sense sound outside of the vehicle; a database configured to store characteristic information of a plurality of specific sounds and visual information corresponding to the characteristic information of the plurality of specific sounds; an output unit configured to output the visual information corresponding to the plurality of specific sounds; and a control unit configured to extract characteristic information of the sound sensed by the sound sensing unit, determine a type of the sensed sound by comparing the extracted characteristic information with the characteristic information of the plurality of specific sounds stored in the database, and output visual information corresponding to the determined type of the sound through the output unit.

Before extracting the characteristic information of the sound sensed by the sound sensing unit, the control unit may determine whether the sensed sound needs to be visualized, and then extract the characteristic information of the sensed sound when the sensed sound needs to be visualized.

A plurality of sound sensing units may be provided, and when a sound is sensed by a predetermined number of sound sensing units of the plurality of sound sensing units and a magnitude of sound pressure of the sound sensed by the predetermined number of sound sensing units is equal to or greater than a predetermined magnitude, the control unit may determine that the sensed sound needs to be visualized.

The extracted characteristic information of the sensed sound may be frequency information of the sensed sound.

When the control unit determines that the sound sensed by the sound sensing unit needs to be visualized, the control unit may collect the sound a predetermined number of times through the sound sensing unit.

The control unit may extract characteristic information of the sound collected a specific number of times, select a specific number of items of characteristic information from the extracted characteristic information, compare the selected specific number of items of the characteristic information with the characteristic information of the plurality of specific sounds stored in the database, determine that the sound sensed by the sound sensing unit is a specific sound of the plurality of specific sounds stored in the database when a difference between the selected specific number of items of the characteristic information and the characteristic information of the plurality of specific sounds stored in the database is equal to or less than a predetermined value, and output visual information corresponding to the specific sound through the output unit.

The warning system may further include a light emission unit emitting light of colors corresponding to the plurality of specific sounds or specific driving situations.

When the control unit determines that the sound sensed by the sound sensing unit is a specific sound of the plurality of specific sounds stored in the database, the control unit may control the light emission unit to emit light of a color corresponding to the specific sound of the plurality of specific sounds.

The specific driving situations may include at least one of a speeding situation and a rear-warning situation.

The control unit may control the light emission unit to emit light of colors corresponding to the specific driving situations.

When the control unit determines that the sound sensed by the sound sensing unit needs to be visualized, the control unit may update the characteristic information of the plurality of specific sounds stored in the database on the basis of characteristic information of the sensed sound.

In accordance with an aspect of the present disclosure, a method of controlling a warning system for a hearing-impaired person may include: determining, by a controller, whether a sound sensed by a sound sensing unit needs to be visualized; extracting, by the controller, characteristic information of the sound sensed by the sound sensing unit; determining, by the controller, a type of the sensed sound by comparing the extracted characteristic information with the characteristic information of a plurality of specific sounds stored in the database; and outputting, by an output unit, visual information corresponding to the determined type of the sensed sound.

The method may further include determining whether a sound sensed by the sound sensing unit is a sound that needs to be visualized, before extracting characteristic information of the sound sensed by the sound sensing unit.

In the determining of whether the sound sensed by the sound sensing unit is a sound that needs to be visualized, a sound may be determined as a sound that need to be visualized when the sound is sensed by a predetermined number of or more sound sensing units and the magnitude of sound pressure of the sensed sound measured by the predetermined number of sound sensing units is equal to or greater than a predetermined magnitude.

In the determining of the type of the sensed sound by comparing the extracted characteristic information with characteristic information of the plurality of specific sounds stored in the database, the sensed sound is determined as a specific sound of the plurality of specific sounds stored in the database when the difference between a predetermined number of items of characteristic information selected from the extracted characteristic information and the characteristic information of the plurality of specific sounds stored in the database is equal to or less than a predetermined value.

In one form, the extracted characteristic information of the sensed sound is frequency information.

According to the present disclosure, it is possible to enable hearing-impaired people who have difficulty in hearing horn sounds and warning sounds to safely drive with appropriate measures when horn sounds and warning sounds are generated around their vehicles by providing visual information corresponding to the horn sounds and warning sounds generated outside the vehicle through an output unit, and a method of controlling the warning system.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
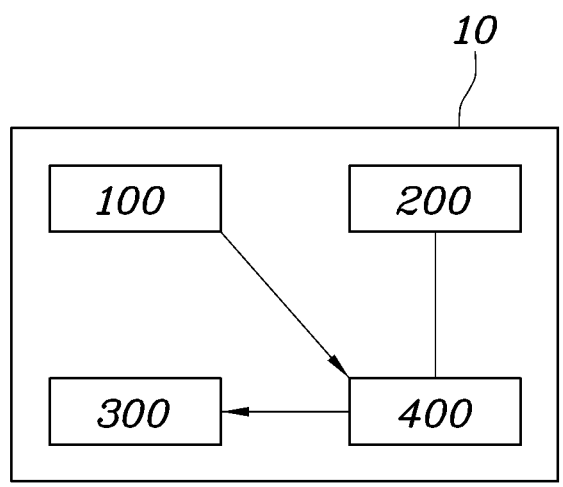
FIG. 1 is a diagram showing the configuration of a warning system for a hearing-impaired person of a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A warning system for a hearing-impaired person of a vehicle and a method of controlling the warning system in one form of the present disclosure will be described herein with reference to the accompanying drawings.

Figure 2:
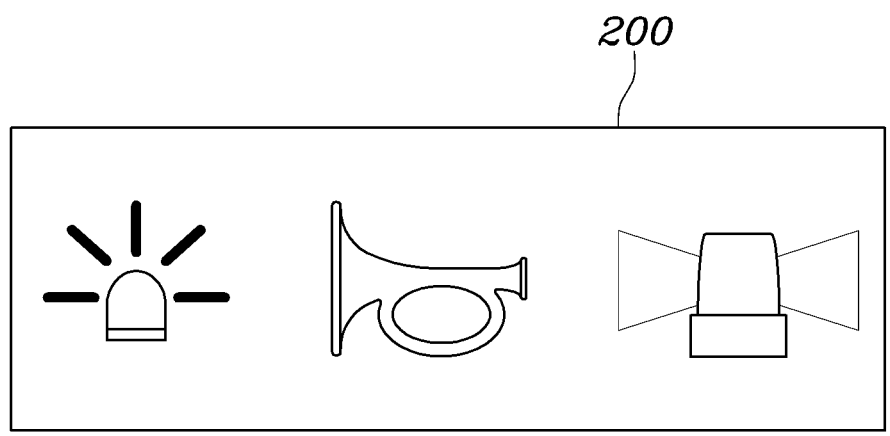
FIG. 2 is a diagram showing visual information corresponding to characteristic information of several specific sounds stored in a database in the warning system for a hearing-impaired person of a vehicle.
Figure 3:
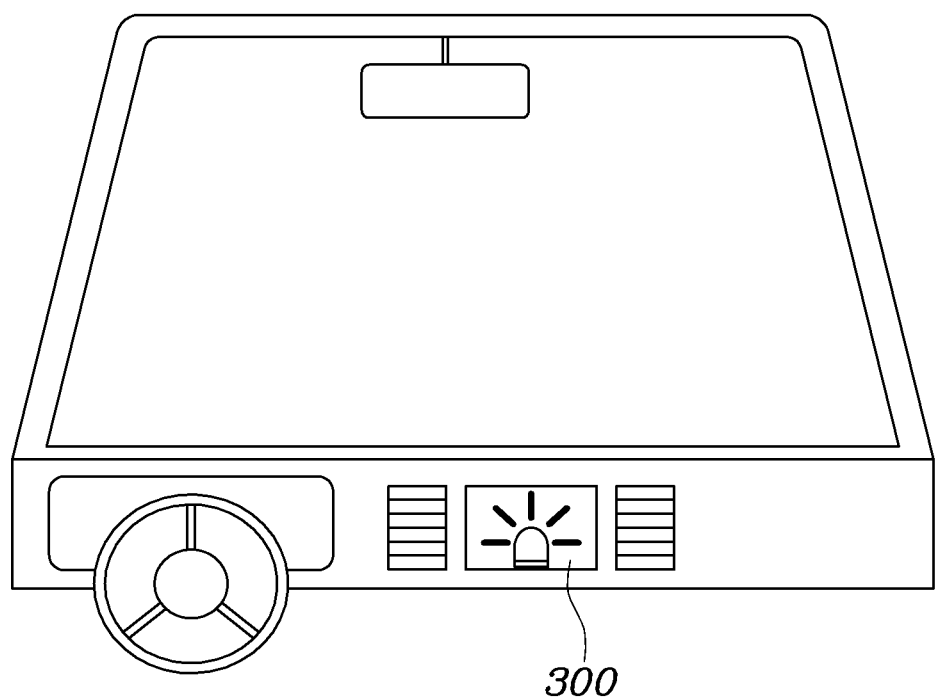
FIG. 3 is a diagram showing the state in which visual information corresponding to a specific sound has been output on an output unit by the warning system for a hearing-impaired person of a vehicle.
Figure 4:
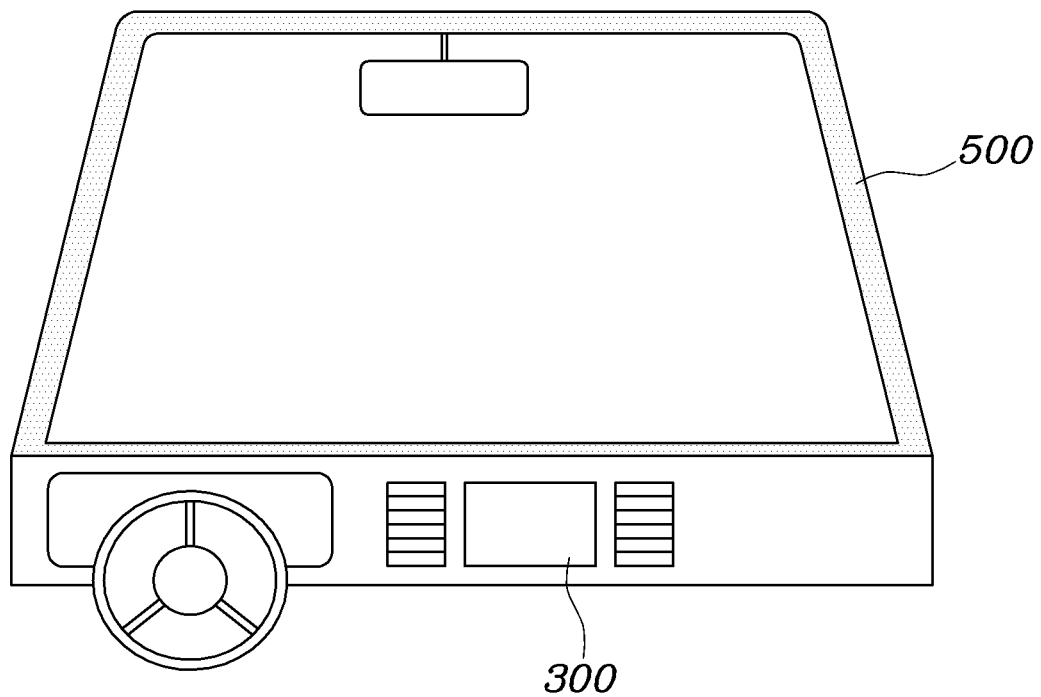
FIG. 4 is a diagram showing a light emission unit of the warning system for a hearing-impaired person of a vehicle.
Figure 5:
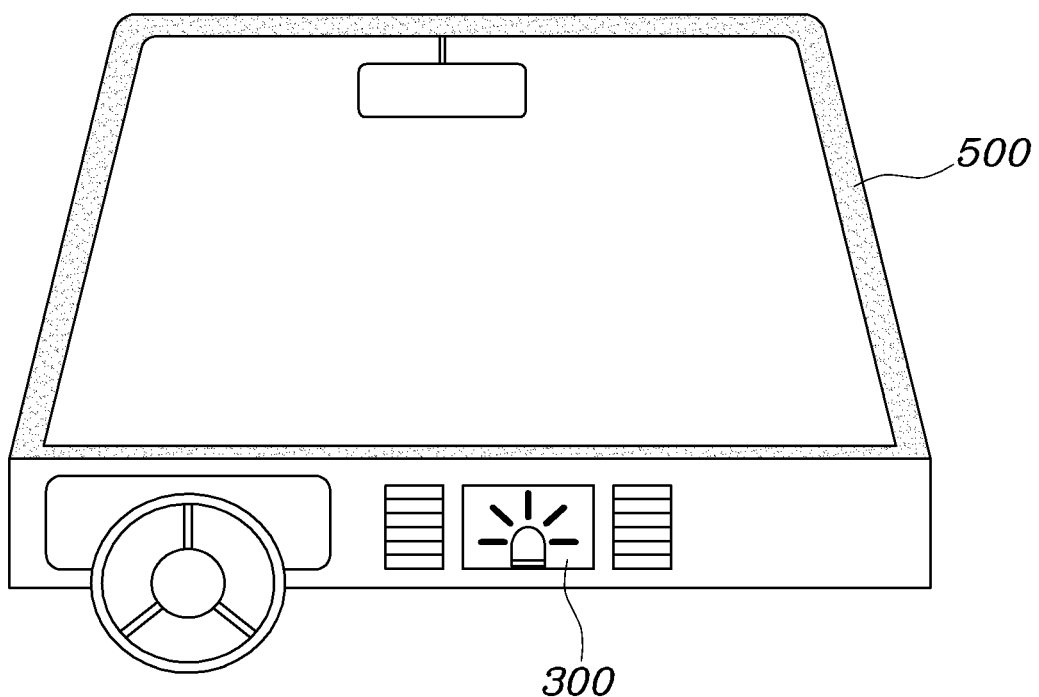
FIG. 5 is a diagram showing the case in which the light emitting unit emits light of a color corresponding to an ambulance siren when an ambulance siren is heard, in the warning system for a hearing-impaired person of a vehicle.
Figure 6:
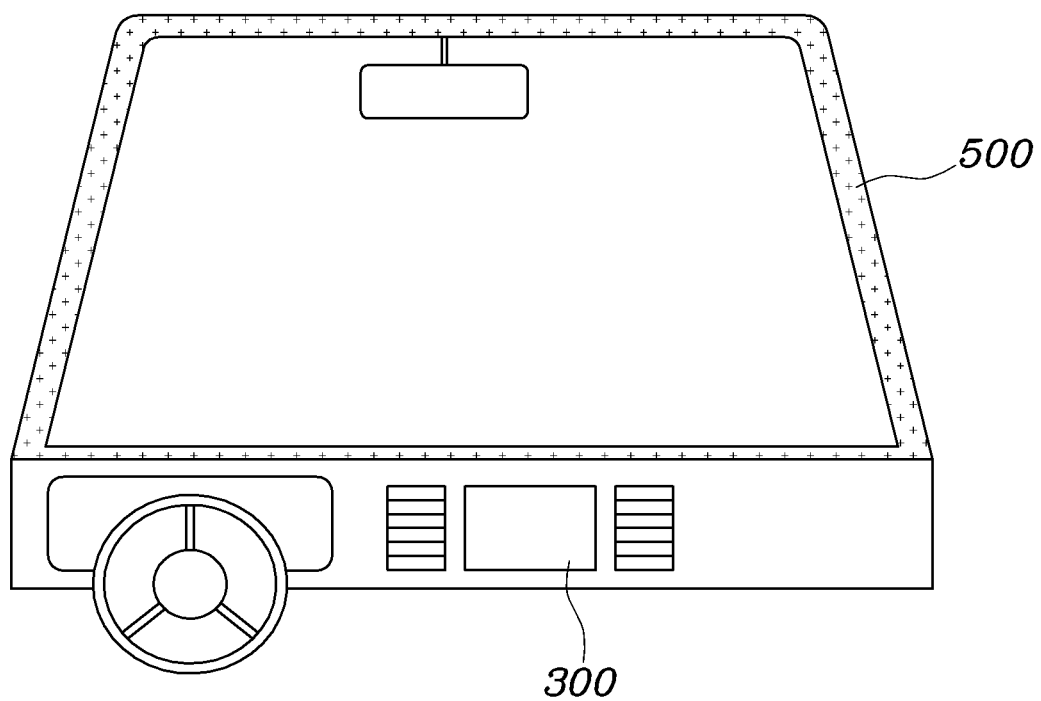
FIG. 6 is a diagram showing the case in which the light emitting unit emits light of a color corresponding to a speeding situation when it is a speeding situation, in the warning system for a hearing-impaired person of a vehicle.

FIG. 1 is a diagram showing the configuration of a warning system for a hearing-impaired person of a vehicle in one form of the present disclosure, FIG. 2 is a diagram showing visual information corresponding to characteristic information of several specific sounds stored in a database, FIG. 3 is a diagram showing the state in which visual information corresponding to a specific sound has been output on an output unit, FIG. 4 is a diagram showing a light emission unit of the warning system for a hearing-impaired person of a vehicle in one form of the present disclosure, FIG. 5 is a diagram showing the case in which the light emitting unit emits light of a color corresponding to an ambulance siren when an ambulance siren is heard, FIG. 6 is a diagram showing the case in which the light emitting unit emits light of a color corresponding to a speeding situation when it is a speeding situation.

As shown in FIG. 1, a warning system for a hearing-impaired person of a vehicle may include: a sound sensing unit 100, a database 200, an output unit 300, and a control unit 400. In other forms, the warning system may further include a light emission unit 500. The detailed configuration of the warning system for a hearing-impaired person of a vehicle in one form of the present disclosure is described in detail hereafter.

The sound sensing unit 100 is disposed outside the vehicle 10 and senses sounds that are generated outside the vehicle. The sound sensing unit 100 stated herein may be a sound sensor or a microphone that can sense sounds. However, this is just one form and various electronic elements and devices can be used as the sound sensing unit as long as they can sense sounds that are generated outside the vehicle.

In detail, a plurality of sound sensing units 100 may be disposed outside the vehicle, and depending on forms, sound sensing units may be disposed on the side mirrors and the rear bumper. However, the positions where the sound sensing units 100 are disposed are not limited thereto and the sound sensing units 100 can be disposed at any desired position as long as they can effectively sense sounds that are generated outside the vehicle more. The sound sensing units 100 are connected with the control unit 400 for communication and sound information that is generated outside and sensed by the sensing units 100 can be transmitted to the control unit 400.

The database 200 stores characteristic information of a plurality of specific sounds and visual information corresponding to characteristic information of specific sounds. The characteristic information of specific sounds may be the frequency information of the specific sounds. That is, the frequency information of a plurality of specific sounds and visual information corresponding to the frequency information of the specific sounds can be stored in the database 200. In detail, referring to FIG. 2, characteristic information of an ambulance siren, a horn sound, and a police car siren may be stored in the database 200. Further, visual information corresponding to the ambulance siren, the horn sound, and the police car siren may be stored in the database 200, as shown in FIG. 2.

The output unit 300 outputs visual information corresponding to specific sounds. The output unit 300 is connected with the control unit 400 for communication and can output visual information of specific sounds that are selected by the control unit 400. In detail, when an ambulance siren is sensed by the sound sensing units 100, as shown in FIG. 3, a siren image corresponding to the ambulance siren can be output through the output unit 300. Further, in another form, the output unit 300 may include an Audio, Video, and Navigation (AVN), a Head Up Display (HUD), and a cluster etc. that can output visual information including characters, images etc.

The control unit 400 can extract characteristic information of a sound sensed by the sound sensing units 100, determine the type of the sound by comparing the extracted characteristic information with the characteristic information of specific sounds stored in the database 200, and output visual information corresponding to the determined type of the sound through the output unit 300. As described above, the characteristic information of sounds may be frequency information. That is, the control unit 400 can extract the frequency information of sounds sensed by the sound sensing units 100, determine the types of the sounds by comparing the extracted frequency information with the frequency information of specific sounds stored in the database 200, and output visual information corresponding to the determined types of sounds through the output unit 300.

Before extracting the characteristic information of a sound sensed by the sound sensing units 100, the control unit 400 can determine whether the sound is a sound that needs to be visualized, and then can extract the characteristic information of the sound when determining that the sound is a sound that needs to be visualized. The reason that the control unit 400 determines whether a sound sensed by the sound sensing units 100 is a sound that needs to be visualized is because it is not required to visualize and provide all sounds generated outside the vehicle to the driver and is for visualizing only specific sounds that the driver needs to drive, including an ambulance siren, horn sounds of other vehicles, a police car siren etc. Accordingly, the control unit 400 can determine first whether an external sound sensed by the sound sensing units 100 is a sound that needs to be visualized.

In detail, when determining whether a sound sensed by the sound sensing units 100 is a sound that needs to be visualized, the control unit 400 can determine that a sound is a sound that need to be visualized when the sound is sensed by a predetermined number of or more sound sensing units 100 and the sound pressure of the sensed sound is a predetermined magnitude or more. For example, assuming that it is set to determine a sound as a sound that need to be visualized when two or more sound sensing units 100 sense the sound and the magnitude of the sound pressure of the sensed sound is 100 dB or more, the control unit 400 determines how many sound sensing units 100 have sensed a sound, and when the sound has been sensed by two or more sound sensing units 100, the control unit 400 determines whether the magnitude of the sound pressure of the sound is 100 dB or more, thereby being able to determine whether the sound is a sound that needs to be visualized. The reason that the control unit 400 visualizes a sound only when the sound is sensed by a specific number or more sound sensing units 100 and the magnitude of the sound pressure of the sensed sound is a predetermined level or more is for filtering out external sounds that may be classified as noise.

Further, when determining that a sound sensed by the sound sensing units 100 is a sound that needs to be visualized in the way described above, the control unit 400 can collect the sound a specific number of times through the sound sensing units 100. The reason of collecting the sound determined as a sound that needs to be visualized, by a specific number of times, is for more accurately determining the type of the sound by collecting various data to be compared with the characteristic information of the specific sounds stored in the database 200 and then comparing them.

The control unit 400 extracts the characteristic information of the sound collected a specific number of times, selects a specific number of items of characteristic information from the extracted characteristic information, and compares the selected characteristic information with the characteristic information of the specific sounds stored in the database 200. Then, when the difference is a predetermined value or less, the control unit 400 can determine that the sound sensed by the sound sensing units 100 is a specific sound stored in the database 200 and can output the visual information corresponding to the specific sound through the output unit 300. The reason of extracting the characteristic information of the collected sound, that is, of extracting the frequency information and selecting only a specific number of items of frequency information from the extracted frequency information is for simplifying the process of determining the sound sensed by the sound sensing unit 100 by selecting frequencies at a specific number of bands and then comparing the selected frequencies with the frequency information of the specific sounds stored in the database 200 because the sound sensed by the sound sensing unit 100 is composed of several sounds with different frequencies. For example, the control unit 400 can select frequencies at only three bands from the frequency information extracted from a sound sensed by the sound sensing units 100 and compare the three frequencies with the frequency information of the specific sounds stored in the database 200. When the difference between the selected frequency information and the frequency information of the specific sounds stored in the database 200 is a predetermined value or less as the result of comparison, the control unit 400 can determine that the sound sensed by the sound sensing units 100 is a specific sound stored in the database 200.

For example, assuming that it is set to determine a sound sensed by the sound sensing units 100 as a specific sound stored in the database 200 when the difference between the frequency of a sound sensed by the sound sensing units 100 and the frequencies of the specific sound stored in the database 200, that is, an error is 30% or less, when a sound is sensed by a predetermined number of or more sound sensing units 100, the magnitude of the sound pressure of the sensed sound is a predetermined magnitude of sound pressure or more, and the difference between the frequency of the sound extracted by the control unit 400 and the frequency the ambulance siren stored in the database 200 is 30% or less, the control unit 400 can determine that the sound sensed by the sound sensing units 100 is an ambulance siren and output the visual information corresponding to the ambulance siren through the output unit 300.

The warning system for a hearing-impaired person of a vehicle in another form of the present disclosure may further include a light emission unit 500 that emits light of colors corresponding to specific sounds or specific driving situations. The light emission unit 500 may be an LED, depending on forms, and may be disposed around a windshield glass, as shown in FIG. 4.

When the control unit 400 determines a sound sensed by the sound sensing units 100 is a specific sound stored in the database 200, it can control the light emission unit 500 to emit light of a color corresponding to the specific sound. For example, when a sound sensed by the sound sensing units 100 is an ambulance siren, the control unit 400, as shown in FIG. 5, can control the light emission unit 500 to emit green light corresponding to the ambulance siren. In this way, when a sound sensed by the sound sensing units 100 is a horn sound from another vehicle or a police car siren, the control unit 400 can control the light emission unit 500 to emit light of a color corresponding to the horn sound or the police car siren.

When the vehicle is driven in a specific driving situation, the control unit 400 can control the light emission unit 500 to emit light of a color corresponding to the specific driving situation. The specific driving situation may include a speeding situation, a rear-warning situation etc. That is, when the vehicle speeds, the control unit 400 can control the light emission unit 500 to emit light of a red color corresponding to the speeding situation, as shown in FIG. 6. Similarly, in the rear-warning situation, the control unit 400 can control the light emission unit 500 to emit light of a specific color corresponding to the situation.

In order to attract attention of a driver, the control unit 400 can repeat turning on/off the entire light emission unit 500 for a specific time, and in another form, it can divide the light emission unit 500 and sequentially turn on/off the sections.

When the control unit 400 determines a sound sensed by the sound sensing units 100 is a sound that needs to be visualized, it can update the characteristic information of the specific sounds stored in the database 200 on the basis of the characteristic information of the sensed sound. When the characteristic information of the specific sound stored in the database 200 is updated, there may be a difference between the characteristic information of the specific sounds stored in the database 200 and the characteristic information of the sound actually sensed by the sound sensing units 100 because theoretical values are initially stored in the database 200. In order to solve this problem, when determining that a sensed sound is a sound that needs to be visualized, the control unit 400 updates the characteristic information of the specific sounds stored in the database 200, whereby the type of the sound sensed by the sound sensing unit 100 can be more accurately classified.

Figure 7:
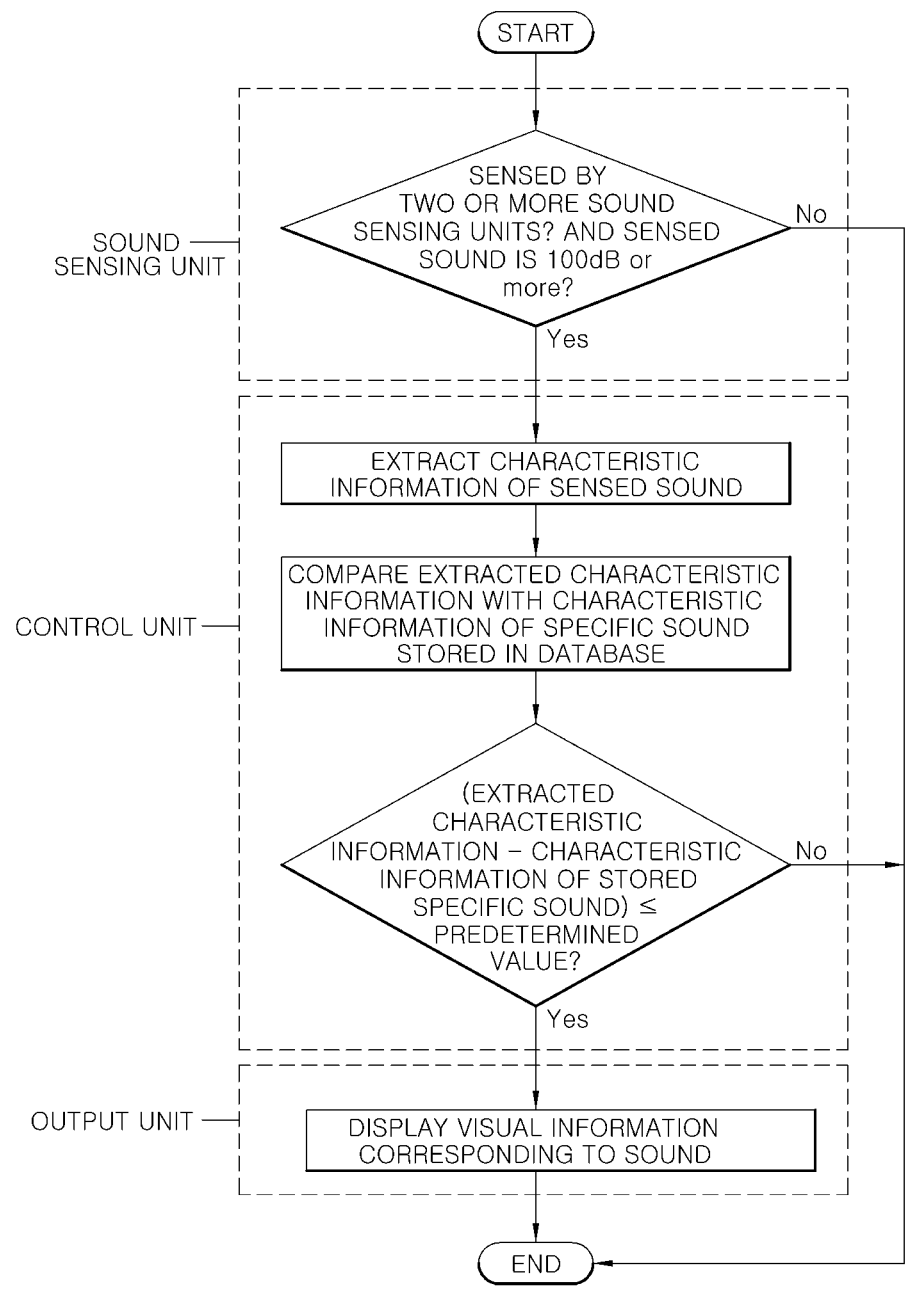
FIG. 7 is a flowchart showing a method of controlling a warning system for a hearing-impaired person of a vehicle.

FIG. 7 is a flowchart showing a method of controlling a warning system for a hearing-impaired person of a vehicle in one form of the present disclosure. In detail, a method of controlling a warning system for a hearing-impaired person of a vehicle may include: determining whether a sound sensed by sound sensing units is a sound that needs to be visualized; extracting characteristic information of the sound sensed by the sound sensing units; determining the type of the sensed sound by comparing the extracted characteristic information with characteristic information of specific sounds stored in the database; and outputting visual information corresponding to the type of the sound through an output unit.

In detail, in the determining of whether a sound sensed by the sound sensing units is a sound that needs to be visualized, it is possible to determine that a sound is a sound that need to be visualized when the sound is sensed by a predetermined number of or more sound sensing units and the magnitude of the sound pressure of the sensed sound is a predetermined magnitude or more. For example, as shown in FIG. 7, assuming that it is set to determine that a sound is a sound that needs to be visualized when the sound is sensed by two or more sound sensing units and the magnitude of sound pressure of the sensed sound is 100 dB or more, it is possible to determine that only sounds that are sensed by two or more sound sensing units and have magnitude of sound pressure of 100 dB or more as sounds that need to be visualized. The reason of visualizing a sound only when the sound is sensed by a predetermined number or more sound sensing units and the magnitude of the sound pressure of the sensed sound is a predetermined level or more is for filtering outs external sounds that may be classified as noise.

Further, in the extracting of characteristic information of the sound sensed by the sound sensing units, when it is determined that the sound sensed by the sound sensing units are a sound that needs to be visualized, characteristic information of the sound can be extracted. The characteristic information of the sound may be frequency information.

In the determining of the type of the sound by comparing the extracted characteristic information with characteristic information of a specific sound stored in the database, when the difference between a predetermined number of items of characteristic information selected from the extracted characteristic information and the characteristic information of the specific sounds stored in the database is a predetermined value or less, the sound sensed by the sound sensing units can be determined as a sound stored in the database. The characteristic information may be frequency information of a sound.

For example, assuming that it is set to determine a sound sensed by the sound sensing units as a specific sound stored in the database when the difference between the frequency of a sound sensed by the sound sensing units and the frequency of a specific sound stored in the database, that is, an error is 30% or less, when a sound is sensed by a predetermined number of or more sound sensing units, the magnitude of the sound pressure of the sensed sound is a predetermined magnitude of sound pressure or more, and the difference between the frequency of the sound extracted by a control unit and the frequency the an ambulance siren stored in the database is 30% or less, it is possible to determine that the sound sensed by the sound sensing units is an ambulance siren.

In the outputting of visual information corresponding to the determined type of sound though an output unit, when the type of the sound sensed by the sound sensing units is determined through the step described above, visual information corresponding to the type of the sound can be output through the output unit. For example, when that sound sensed by the sound sensing units is determined as an ambulance siren, visual information corresponding to an ambulance siren can be output through the output unit. The visual information may include an ambulance-shaped icon.

Depending on forms, when the type of the sound sensed by the sound sensing units is determined through the step described above, it is possible to emit light of a color corresponding to the type of the sound through a light emission unit. For example, when that sound sensed by the sound sensing units is determined as an ambulance siren, green light corresponding to an ambulance siren can be emitted through the light emission unit.

Although a few forms of the present disclosure have been shown and described, it would be appreciated by those skilled in the art that changes may be made in these forms without departing from the principles and spirit of the disclosure, the scope of which is defined in the present disclosure,

What is claimed is:

1. A warning system for a hearing-impaired person of a vehicle, the warning system comprising:
    a sound sensing unit disposed at a vehicle and configured to sense sound outside of the vehicle;
    a database configured to store characteristic information of a plurality of specific sounds and visual information corresponding to the characteristic information of the specific sounds;
    an output unit configured to output the visual information; and
    a control unit configured to:
        determine whether the sensed sound needs to be visualized,
        extract characteristic information of the sound sensed by the sound sensing unit when the sensed sound needs to be visualized,
        determine a type of the sound by comparing the extracted characteristic information with the characteristic information of the plurality of specific sounds stored in the database, and
        output visual information corresponding to the determined type of the sound through the output unit,
    wherein when the control unit determines that the sensed sound needs to be visualized, the control unit is configured to:
        collect the sound a predetermined number of times through the sound sensing unit,
        extract characteristic information of the sound collected the predetermined number of times,
        select a specific number of items of the characteristic information from the extracted characteristic information, and
        compare the selected specific number of items of the characteristic information with the characteristic information of the plurality of specific sounds stored in the database.

2. The warning system of claim 1, further comprising: a plurality of sensing units configured to sense the sound outside of the vehicle, wherein when the sound is sensed by a predetermined number of sound sensing units of the plurality of sensing units and a magnitude of sound pressure of the sound sensed by the predetermined number of sound sensing units is equal to or greater than a predetermined magnitude, the control unit is configured to determine that the sensed sound needs to be visualized.

3. The warning system of claim 1, wherein the extracted characteristic information of the sensed sound is frequency information of the sensed sound.

4. The warning system of claim 1, wherein the control unit is configured to:
    determine that the sound sensed by the sound sensing unit is a specific sound of the plurality of specific sounds stored in the database when a difference between the selected specific number of items of the characteristic information and the characteristic information of the plurality of specific sounds stored in the database is equal to or less than a predetermined value, and
    output visual information corresponding to the specific sound through the output unit.

5. The warning system of claim 1, further comprising: a light emission unit configured to emit light of colors corresponding to the plurality of specific sounds or specific driving situations.

6. The warning system of claim 5, wherein when the control unit determines that the sound sensed by the sound sensing unit is a specific sound of the plurality specific sounds stored in the database, the control unit is configured to control the light emission unit to emit light of a color corresponding to the specific sound of the plurality of specific sounds.

7. The warning system of claim 5, wherein the specific driving situations include at least one of a speeding situation or a rear-warning situation.

8. The warning system of claim 7, wherein the control unit is configured to control the light emission unit to emit the light of colors corresponding to the specific driving situations.

9. The warning system of claim 1, wherein when the control unit determines that the sound sensed by the sound sensing unit needs to be visualized, the control unit is configured to update the characteristic information of the plurality of specific sounds stored in the database based on the characteristic information of the sensed sound.

10. A method of controlling a warning system for a hearing-impaired person of a vehicle, the method comprising:
    determining, by a controller, whether a sound sensed by a sound sensing unit needs to be visualized;
    collecting, by the controller, the sound a predetermined number of times through the sound sensing unit;
    extracting, by the controller, characteristic information of the sound sensed by the sound sensing unit;
    determining, by the controller, a type of the sensed sound by comparing the extracted characteristic information with the characteristic information of a plurality of specific sounds stored in the database; and
    outputting, by an output unit, visual information corresponding to the determined type of the sensed sound,
    wherein in determining the type of the sensed sound, the sensed sound is determined as a specific sound of the plurality of specific sounds stored in the database when a difference between a predetermined number of items of characteristic information selected from the extracted characteristic information and the characteristic information of the plurality of specific sounds stored in the database is equal to or less than a predetermined value.

11. The method of claim 10, wherein the visualization of the sensed sound is determined when a magnitude of sound pressure of the sensed sound measured by a predetermined number of sounding sensing units is equal to or greater than a predetermined magnitude.

12. The method of claim 10, wherein the extracted characteristic information of the sensed sound is frequency information.

* * * * *